United States Patent [19]

Koto

[11] Patent Number: 4,462,035

[45] Date of Patent: Jul. 24, 1984

[54] NON-IMPACT RECORDING DEVICE

[75] Inventor: Haruhiko Koto, Shiojiri, Japan

[73] Assignees: Epson Corporation, Nagano; Kabushiki Kaisha Suwa Seikosha, Tokyo, both of Japan

[21] Appl. No.: 357,923

[22] Filed: Mar. 15, 1982

[30] Foreign Application Priority Data

Mar. 16, 1981 [JP] Japan .................................. 56-37607
Mar. 16, 1981 [JP] Japan .................................. 56-37609

[51] Int. Cl.$^3$ ......................... G01D 15/10; H05B 1/00

[52] U.S. Cl. ................................. 346/76 PH; 219/216

[58] Field of Search .................... 400/120; 346/1.1, 76; 219/216 PH

[56] References Cited

U.S. PATENT DOCUMENTS

| | | | |
|---|---|---|---|
| 3,074,809 | 1/1963 | Owen | 346/76 R X |
| 4,293,866 | 10/1981 | Takita et al. | 346/140 R |
| 4,350,449 | 9/1982 | Countryman et al. | 346/76 R X |
| 4,359,748 | 11/1982 | Pasini et al. | 346/76 PH |
| 4,369,451 | 1/1983 | Sekido et al. | 346/76 PH |

OTHER PUBLICATIONS

Terminal Transfer Recording for Two-Color Facsimile, T. Shimizu and M. Ozawa, Tappi/ Nov. 1980, vol. 63, No. 11.

*Primary Examiner*—Donald Griffin
*Attorney, Agent, or Firm*—Blum, Kaplan, Friedman, Silberman & Beran

[57] ABSTRACT

In a substantially continuous process, solid ink is melted and deposited on a recording roller where it solidifies as a surface coating. Subsequently, heat is applied selectively and locally to portions of the roller to remelt the ink. A recording chart pressed against the moving roller picks up and retains the melted ink, thereby dots or segments of characters are formed on the recording chart. A plurality of heating means may be used so that printing in a dot matrix is made feasible.

21 Claims, 11 Drawing Figures

NON-IMPACT RECORDING DEVICE

BACKGROUND OF THE INVENTION

This invention relates generally to a recording device for printing with ink on a recording medium, and more particularly to a non-impact recording device which uses thermal energy for printing. Various types of non-impact recording devices have been proposed and some have been put to practical use. Of these devices, the most noteworthy are heat sensitive recording devices and presently a substantial number of heat sensitive recording devices are in practical use because of their simple construction. However, this type of recording device uses heat sensitive paper and a recording chart. Therefore, there are problems with respect to deterioration of the paper and effacement of written records by high temperatures and organic solvents. Maintenance costs are also high.

To resolve these difficulties, a so-called heat transfer type thermal printing system is conventionally used for transferring heat-melting ink to ordinary paper. The ink is carried on a film for subsequent application to the paper. This approach solves the problems stated above of deterioration and instability of the records, but a drawback remains in that maintenance cost is comparatively high because the price of the ink film is high and it is difficult to type many times on the same ink film, unlike conventional impact ink ribbons.

What is needed is a non-impact recording device using thermal energy which provides high stability for the recorded matter and records even on ordinary paper without high cost.

SUMMARY OF THE INVENTION

Generally speaking, in accordance with the invention, a non-impact recording device especially suitable for recording with ink on conventional paper is provided. In a substantially continuous process, solid ink is melted and deposited on a recording roller where it solidifies as a surface coating. Subsequently, heat is applied selectively and locally to portions of the roller to remelt the ink. A recording chart pressed against the moving roller picks up and retains the melted ink, thereby dots or segments of characters are formed on the recording chart. A plurality of heating means may be used so that printing in a dot matrix is made feasible.

Accordingly, it is an object of this invention to provide an improved non-impact recording device which is capable of recording on ordinary paper and has high stability of the recorded data.

Another object of this invention is to provide an improved non-impact recording device having low maintenance costs.

A further object of this invention is to provide an improved non-impact recording device which prints by application of thermal energy to the printing ink.

Still another object of this invention is to provide an improved non-impact recording device which is thermally operated and outputs a plurality of printed copies.

Still other objects and advantages of the invention will in part be obvious and will in part be apparent from the specification.

The invention accordingly comprises the features of construction, combination of elements and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
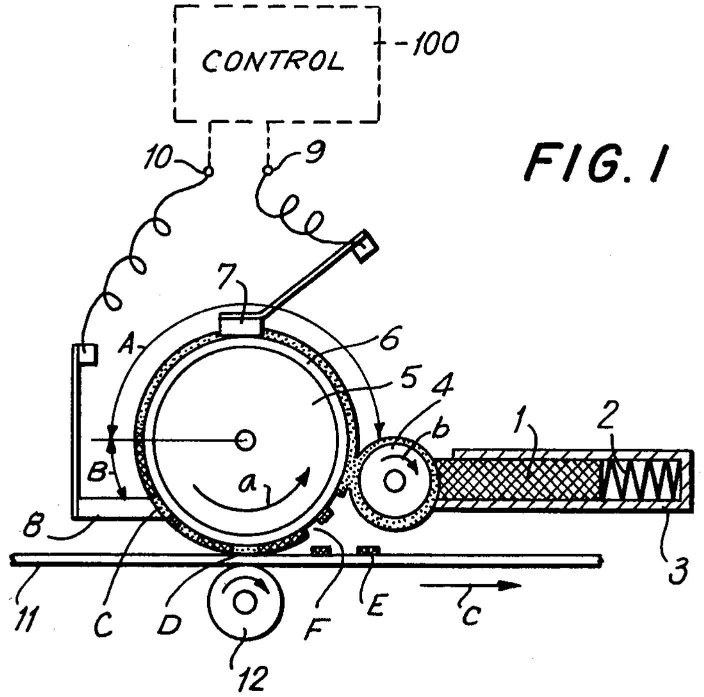
FIG. 1 is a side sectional view, with parts omitted of a non-impact recording device in accordance with the invention.

With reference to FIG. 1, a non-impact recording device in accordance with the invention includes ink 1 in an ink container 3, an ink feed member 2, and an ink melting roller 4. The device also includes a recording roller 5, an electrically conductive layer 6 disposed on the circumference of the recording roller 5, brushes 7, 8, terminals 9, 10, a recording chart 11, and a pressure roller 12.

The ink has the special characteristic that it is a super cooling ink which remains solid at room temperature but melts when heated above its melting point. The ink also can remain in a super cooled fluid state in excess of a prescribed duration of time even when cooled below the melting point. The ink is electrically conductive per se, and accordingly, the ink temperature rises when a current is passed through the ink, that is, when the ink is energized. In FIG. 1, the solid ink state is represented by cross-hatched lines and the liquid state is represented by dots.

Operation of the recording device of FIG. 1 is as follows. The ink melting roller 4 and the recording roller 5 turn in the directions of the respective arrows a,b. Accordingly, the recording chart 11, which is pressed by the pressure roller 12 against the recording roller 5, is fed in the direction of the arrow c. At this time, the ink melting roller 4 is energized through an electrode (not shown) with the temperature of the ink melting roller 4 being controlled so as to be above the melting point of the ink 1 as a result of a Joule heating effect. Therefore, solid ink 1 that comes into contact with the ink melting roller 4 is melted and applied to the surface of the ink melting roller 4 in a layer. Then, this melted ink 1 is transferred from the roller 4 to the recording roller 5. At this moment, the temperature of the recording roller 5 is lower than the melting point of the ink 1. However, the ink 1, being of a super cooling type, remains in the liquid state as it moves with the recording roller 5 through the rotating angle defined in FIG. 1 as A. In zone B, as the roller 5 continues to rotate, the ink 1 sets, that is, solidifies. At point C, an input signal from a control circuit 100 is applied to the electrical terminals 9, 10. Thus, electrical power is supplied to the ink 1 facing the brush 8 through a circuit including the brush 7 and the electrically conductive layer 6.

At this time, the ink 1 facing the brush 8 is heated to the melting point by its internal resistance and the current passing through the ink at that location. The melted ink 1 remains in a super coated state as it is transferred to the recording chart 11 at the point D where the recording roller 5 meets the pressure roller 12. Ink 1 thus transferred becomes solid on the recording chart 11, recording as shown at E. Vacancies F in the surface of the ink layer on the recording roller 5 from which the ink 1 has been transferred to the recording chart 11, are refilled by the ink melting roller 4 and the cycle is capable of repetition.

In the above example, (FIG. 1), a non-impact recording device in accordance with the invention uses a super cooling ink and transfers the ink directly from the recording head to the recording chart to produce a firm recording. Accordingly, no expensive ink film is needed. Recording is continuously accomplished simply by refilling the container 3 with a low cost ink.

In the embodiment described above, there is no necessity for turning the ink melting roller 4 and the recording roller 5 at the same circumferential speeds. To the contrary, the circumferential speed can be changed as necessary to insure uniform ink application to the recording roller 5, and further, the ink melting roller 4 can be turned in the reverse direction of that indicated by the arrow b of FIG. 1 and still apply a suitable coating to the recording roller 5 depending on the characteristics of the ink.

Figure 2:
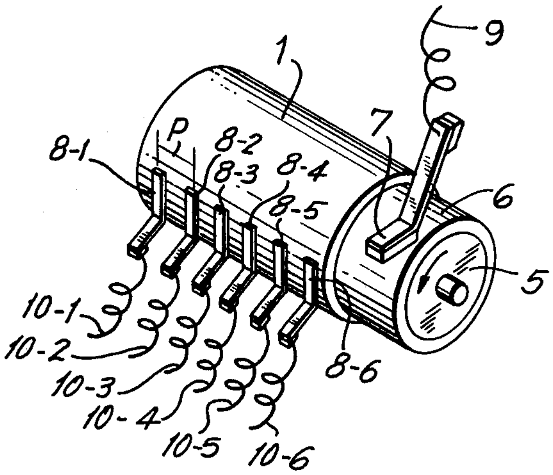
FIG. 2 is a top perspective view of the writing portion of the non-impact recording device of FIG. 1.

In the description above, a dot is formed on the recording chart 11. FIG. 2 shows in greater detail the letter writing portion of the non-impact recording device of FIG. 1 including a capability for recording a plurality of dots simultaneously. A plurality of brushes 8-1, 8-2 . . . 8-6 extend in an axial direction relative to the recording roller 5 at a dot pitch spacing P necessary for recording. The dot pitch P is generally in the order of 0.4 mm or less. Every time the recording roller 5 turns by a circumferential distance equal to a desired vertical dot pitch on the recording chart 11, a signal from the control circuit 100 is applied to selected ones of the terminals 10-1, 10-2, . . . 10-6. Letters and symbols are thus recorded on the recording chart 11 comprised of dots spaced at prescribed intervals in accordance with a vertical and horizontal grid dot matrix.

Figure 3:
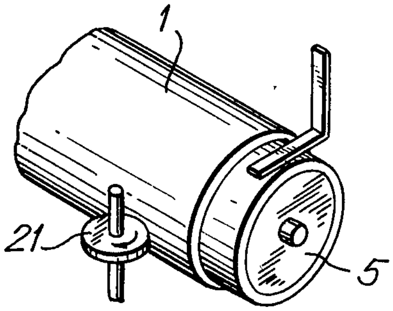
FIG. 3 is a partial view similar to FIG. 2 showing an alternative embodiment of the writing portion.

An alternative embodiment of the brush 8 of FIGS. 1,2 is shown in FIG. 3. In FIG. 3, an energizing roller 21 serving as the brush, travels in the direction of the axis of the recording roller 5 while in rolling contact with solidified ink 1 on the roller 5. As the brush 21 travels, signal current is applied selectively to melt the ink. When ink has been melted for the required dots on one entire horizontal line, the recording roller is turned by one vertical dot spacing interval and energizing for ink melting for the dots of the following line is initiated. The recording roller may be turned intermittently as described above.

The arrangement pitch P of the brushes 8 may be at other magnitudes then in the examples of FIGS. 1 and 2. Also, for example, the pitch P may be set longer than the recording dot pitch and a group of brushes may travel horizontally as shown in the embodiment of FIG. 3. Further, in other alternative embodiments of a non-impact recording device in accordance with the invention, a separately mounted heating device may be used to apply the melted ink to the recording roller rather than the ink melting roller 4 as used in the example of FIG. 1.

Figure 4:
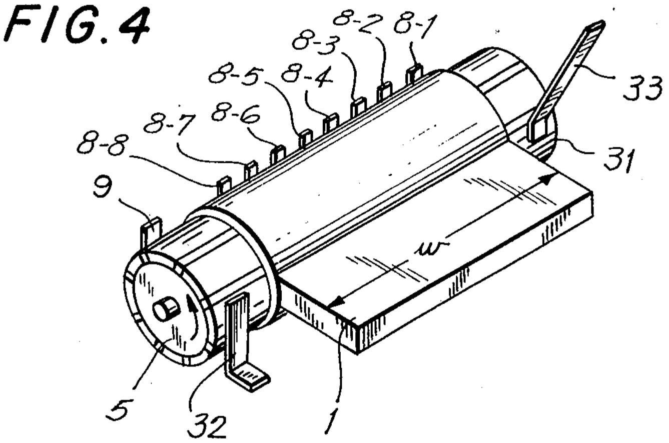
FIG. 4 is a top perspective view of an alternative embodiment of the present invention.

Furthermore, an ink melting roller may be used which also serves as the recording roller as illustrated in FIG. 4. In FIG. 4, an electrically conductive layer 31 is divided in the direction parallel to the axis of the recording roller 5 and brushes 32, 33 for heating are mounted on opposite ends of the recording roller 5. These brushes 32, 33 heat the electrically conductive layer 31 where the solid ink 1 meets the roller. Thus, the ink 1 is melted and applied to the roller. Recording brushes 8-1, 8-2 . . . 8-8 and brush 9 are similar to the energizing brushes shown in FIG. 2. Ink 1, as shown in FIG. 4 is horizontally oriented relative to the recording roller 5 and is of the same width w as the recording area. Also, in an alternative embodiment, the ink supply may be shortened relative to the width of the roller 5 and the ink supply moved horizontally along the roller 5 for complete coverage during ink application. As described above, moving the ink 1 in the thrust direction is advantageous to insure uniform ink application.

Figure 9:
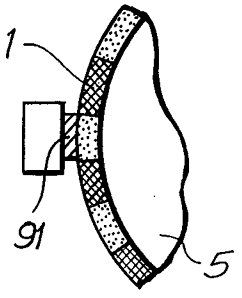

In the embodiment of FIG. 1, melting and application of ink 1 to the recording roller 5 is accomplished by heating. Other methods of ink application are possible such as melting and application of ink 1 by means of a solvent or the ink is applied with a frictional force. Further, in the embodiment of FIG. 1, ink is melted as a result of heat produced by the internal resistance of the ink at the time of writing. As shown in FIG. 9, a heating unit 91, such as a conventional heat sensitive head, is mounted in contact with the ink 1 on the circumference of the recording roller 5 for locally melting of the ink 1. In such an embodiment, the ink is not required to have electrical conductivity.

Figure 5:
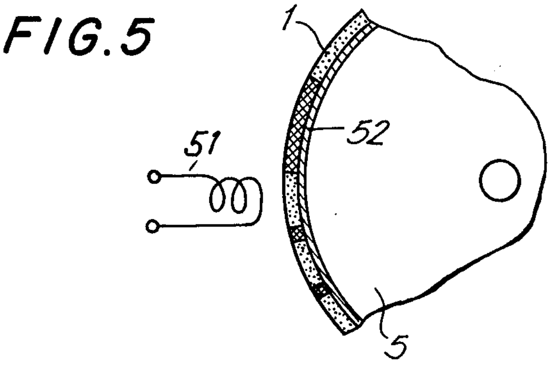
FIGS. 5–7 and 9 are partial sectional, schematic representations of alternative means for writing in a non-impact recording device in accordance with the invention.
Figure 6:
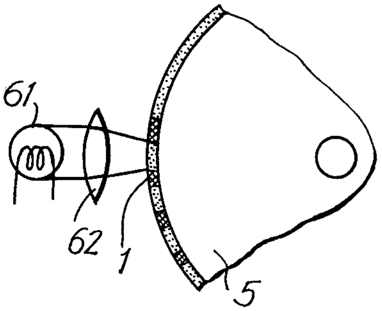
Figure 7:
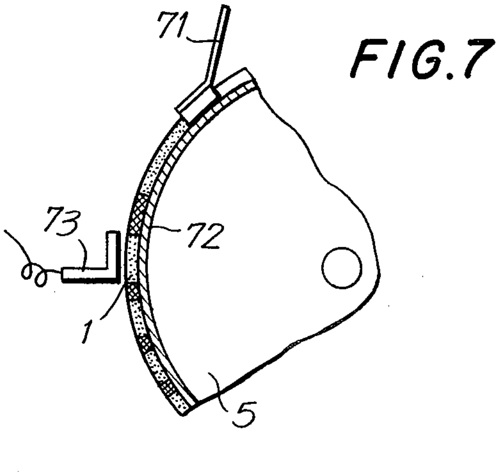

FIGS. 5–7 show additional alternative embodiments for a non-impact recording device in accordance with the invention for melting of ink at positions corresponding with the recording dots. In FIG. 5, the outer peripheral portion 52 of the recording roller 5 is made of pure iron, steel, permalloy, etc. A high-frequency current is supplied to the induction coil 51 to induce currents in the peripheral section 52 and produce localized heat. By utilizing this induction heat, the outer peripheral section 52 is heated to melt the adjacent ink 1. When iron dust, or other magnetic material is mixed in the ink 1, so that the ink itself is heated by the induction coil 51, it is not necessary to provide a magnetically conductive layer as the outer peripheral section 52.

In FIG. 6, infrared rays from an infrared ray lamp 61 are collected by a lens 62, or a concave mirror, and directed to the desired portion to melt the ink 1 on the surface of the roller 5. In FIG. 7, a high frequency electric field is applied across an electrically conductive layer 72 and an electrode 73 for melting ink through a brush 71. The ink is heated so as to melt by its dielectric losses. When the dielectric loss of the ink 1 is low and accordingly, heat efficiency is low, a dielectric layer is provided on the outer periphery of the electrically conductive layer 72 and the ink applied on the outer surface of the dielectric layer is melted by heating the dielectric layer.

Figure 8:
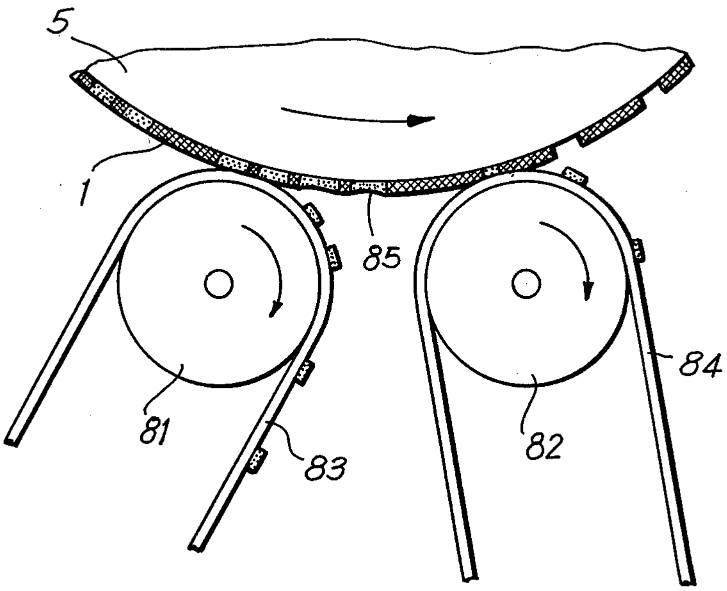
FIG. 8 is a side sectional view to an enlarged scale of transfer means for use in a non-impact recording device in accordance with the invention.

Another alternative embodiment of a non-impact recording device in accordance with the invention is shown at FIG. 8. In this embodiment, two pressure rollers 81, 82 are individually capable of transferring recording ink to a plurality of recording charts 83,84. By selecting the viscosity and other characteristics of the ink 1, it is possible to leave a portion of ink, as at 85, on the recording roller 5 after recording on the chart 83. The ink is also transferred to the recording chart 84 thus producing an additional printed copy.

Ink to be used in each of the above embodiments may be a mixed ink of pigment and wax as generally used in heat transfer when the recording speed is high and the recording drum 5 turns rapidly. Conversely, when the recording speed is low, an ink made of such super cooling materials as sulfur, acetanilide, benztriazole, etc., may be used. Furthermore, ink setting time can be controlled by controlling the surface temperature of the recording roller 5. Ink made by mixing thirty-four parts of cyclohexanol by weight to sixty-six parts of phthalic anhydride by weight, mixed with carbon black as a pigment, keeps its super cooled condition for more than several hours depending on conditions. Such ink is suitable for use in the non-impact recording device in accordance with the present invention.

Furthermore, ink which is thermodynamically not super cooling ink but takes time to solidify because of a great heat capacity, is also usable without deviating from the scope of the invention. It is also possible to use ink that is not perfectly solid at room temperature but which is not suitably transferable without heating due to high viscosity.

In the above embodiments, roller members are disclosed for recording. However, in place of the recording and heat melting rollers described above, flat members may be used. Furthermore, various other constructions are possible, for example, the recording medium need not be constantly pressed to the recording roller and transferring of ink and recording are performed independently of paper feeding.

The non-impact recording devices as described above in accordance with the invention use a super cooling ink, which eliminates the need for an expensive ink film and insures stable recording on ordinary paper and various other recording media. It is possible to heat or write the latent images in either position, that is, in contact with or away from the recording chart. Therefore, it is not necessary to use any recording roller of complicated construction. Also, it is possible to produce a plurality of copies using a device in accordance with the present invention and also to perform multicolor recording. The non-impact recording device is applicable to various types of recording devices such as printers, plotters, facsimile machines, copiers, etc.

Figure 10:
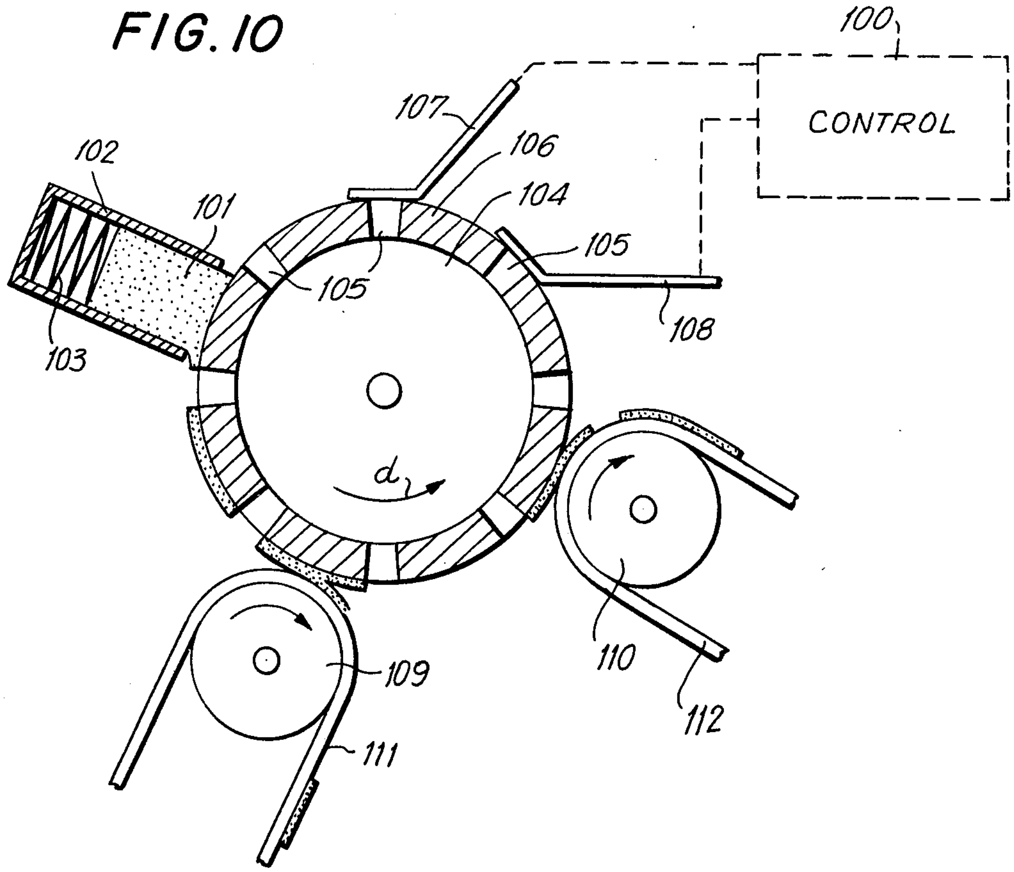
FIG. 10 is a partial side sectional view of an alternative embodiment of a non-impact recording device in accordance with the invention.

Another alternative embodiment of a non-impact recording device in accordance with the invention is shown in FIG. 10 wherein the device includes an ink container 102 containing ink 101 which is solid at room temperature and becomes liquid when heated. The device also includes an ink supply member 103 for furnishing ink in accordance with the rate of consumption of the ink, and a recording head 104. The device also includes electrodes 105 disposed on the peripheral surface of the recording head 104, heating members 106 disposed between electrodes 105, energizing brushes 107, 108, pressure members 109, 110 and recording charts 111, 112.

Operation of the non-impact recording device in accordance with the invention (FIG. 10) is as follows. The recording head 104 rotates in the direction of the arrow d. When electrodes 105 are in the illustrated positions, that is, each of the brushes 107, 108 is in contact with an electrode 105, an input signal from a control circuit 100 is applied to the energizing brushes 107, 108. An electrical current flows through the electrodes 105 into the heating member 106 which is heated by a Joule heating effect.

It is necessary to use a recording head 104 made of a low heat conductivity material such as plastic, graphite, glass, etc., or a porous member in order to improve structurally the thermal insulation properties of the head 104. Thereby, the heat capacity of the heating member 106 is increased. By this construction, the heating member 106, once heated, is prevented from cooling down readily. When the heating member 106 comes to the position where is meets the ink 101, the ink 101 melts if the heating member 106 is hot and ink is applied to the surface of the heating member 106.

Furthermore, when the recording head 104 turns until the inked heating member 106 comes to a position where the chart is being pressed by the pressure member 109, a portion of the ink 101 is transferred from the heating member 106 to the recording chart 111. Furthermore, when the recording head 104 rotates further until the inked heating member 106 comes to a position where the chart 112 is pressed by the pressure member 110, ink 101 remaining untransferred to the first recording chart 111 is transferred to the second recording chart 112.

As described, the non-impact recording device in accordance with the invention (FIG. 10) is capable of forming impressions in ink on ordinary paper without using an expensive film by transferring ink to the recording chart prior to cooling down of the head which has been preheated. Also, as illustrated, the heating, applying and transferring processes are separated for each recording station. Therefore, space is not restricted and respective means can be disposed in the optimum positions and construction of each means can be made simple. Further, as indicated in the description above, it is possible to produce a plurality of copies by providing a plurality of transfer means.

The heating member 106, which must not cool down before transfer of ink to the second recording chart 112 is completed, is kept in the heated condition by restricting heat conduction and increasing heat capacity. Also, the cooling rate of the heating member can be controlled by adjusting the temperature of the recording head 104 or the ambient atmosphere temperature can be controlled. The ink setting time can also be controlled by use of the super cooling properties of the ink itself.

In the embodiment of FIG. 10, the heating member 106 serves as the writing means when energized through the energizing brushes 107, 108. In alternative embodiments, an induction coil may be used in place of the brushes for heating. Also usable as the heating member is an induction material for induction heating by means of a high frequency field. Furthermore, infrared rays for heating may be used. These heating methods have the advantage that heating is accomplished without contact with the ink and thus, construction of the recording head 104 is simplified.

The embodiment of FIG. 10 demonstrates the principles of a non-impact recording device in accordance with the invention. In an actual device, a number of heating members 106, and energizing brushes 107, 108 are disposed in the direction of the rotational axis of the recording head 104 and letters and symbols are recorded in accordance with a dot matrix by applying input signals from a control circuit 100 to the associated heating members as necessary for recording. Furthermore, in place of a dot matrix, segments or a solid font may be used as heating members for typing thus forming shaped portions on the recording chart rather than dots.

Figure 11:
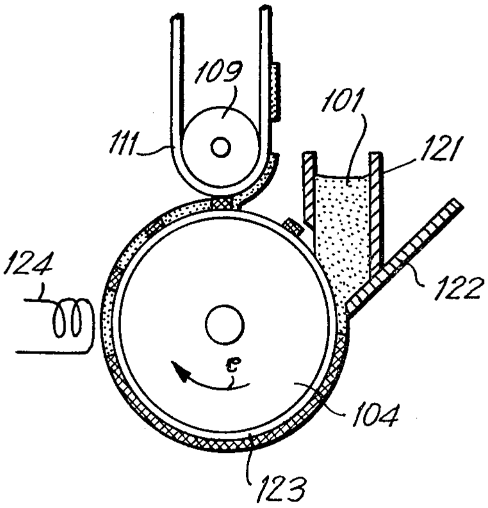
FIG. 11 is a view similar to FIG. 10 of an alternative embodiment of a non-impact recording device in accordance with the invention.

Another alternative embodiment of a non-impact recording device in accordance with the invention is illustrated in FIG. 11. Ink 101 is melted by an ink melting member 121 and applied by an applying member 122. A heating member 123 is disposed on the outer periphery of the recording head 104. The melted ink, indicated by dots in the drawing (FIG. 11), soon becomes solid, indicated by cross-hatching in the drawing, as the recording head 104 rotates as indicated by the arrow e. The portion of ink facing an induction coil 124 is selectively induction heated. A desirable heating material for the member 123 is a high permeability metal such as an electrically conductive material, particularly pure iron, permalloy, etc.

When the recording head 104 has rotated until the ink 101 opposes the induction coil 124, an input signal from a control circuit (not shown) is applied to the heating member 123 which consequently becomes hot and melts the ink 101 locally. By selecting proper ink, and thermal capacity and heat conductivity of the materials so that the heating member 123 does not cool down rapidly, the ink 101 is transferred to a recording chart 111 which is pressed by a pressure member 109 against the recording head 104 as the recording head 104 rotates. In this manner, transferring and recording on the recording chart 111 are accomplished in response to energization of the induction coil 124.

Various alternative embodiments of component parts as discussed above are applicable to the non-impact recording devices of FIGS. 10 and 11. That is, a flat recording head may be used in place of a cylindrical head, and also by moving the recording head, the energizing brushes 107, 108 shown in FIG. 10 can be eliminated. The recording head 104 may be manufactured by various methods such as thick and thin film semi-conductor manufacturing techniques, conventional machining and welding. The inks may be a mixed ink of pigment and wax, paraffin, etc., which are conventionally used in heat transfer type recording. Furthermore, the ink may be an ink which is not necessarily perfectly solid at room temperature but which will not be transferred to the recording medium because of very high viscosity unless further heating is applied.

The ink may be applied as shown in FIG. 11, but in alternative embodiments a solvent for melting and applying ink may be adapted in place of heat melting for application. Also, a frictional force may be applied for application of ink to the recording head. The non-impact recording devices in accordance with the invention FIGS. 10, 11 have writing means for heating a heating member such that melted ink applied to the heating member is transferred to the recording medium. Expensive ink films are eliminated by controlling the cooling rate of the heating member between the time when the heating member is heated by the writing means and the point where transfer to the recording medium is made. This insures stable recording on ordinary paper and on various other recording media.

Furthermore, equipment in each process can be optimized and simplified in order to allow writing, applying and transferring in different positions of respective processes. Reproduction of a plurality of copies is possible and multicolor recording is also feasible.

It will thus be seen that the objects set forth above, among those made apparent from the preceeding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A non-impact recording device for recording with ink on a recording medium, comprising:
   - a recording member having a coating of ink on the surface thereof, said ink coating being subject to melting;
   - means for applying ink to said surface of said recording member to form said coating;
   - writing means for melting said ink coating on said recording member surface, said writing means acting directly on said ink coating to melt said coating, intermediate elements being absent;
   - transfer means for pressing said recording medium against said coated surface, said melted ink becoming attached to said recording medium where said medium is pressed.

2. A non-impact recording device as claimed in claim 1, and further comprising means for transporting said recording medium with said transferred melted ink thereon away from said means for pressing, said ink cooling and solidifying on said recording medium.

3. A non-impact recording device as claimed in claim 2, wherein said writing means is adapted to melt said ink coating prior to said recording means being pressed.

4. A non-impact recording device as claimed in claim 3, wherein said ink is conductive and said writing means is adapted to pass a current through said ink to heat and melt said ink.

5. A non-impact recording device as claimed in claim 3, wherein said writing means is adapted to heat said recording member, said heated recording member causing said ink coating to melt.

6. A non-impact recording device as claimed in claim 1 or 5, wherein said writing means is adapted to melt said ink layer in local print patterns on said recording member, ink being transferred to said recording medium in said print patterns.

7. A non-impact recording device as claimed in claim 2, 3, 4 or 5, and further comprising control means for signal generating, said writing means being adapted to selectively operate in response to an external signal from said control means.

8. A non-impact recording device as claimed in claim 2, 3, 4 or 5, wherein said recording member surface moves from said means for applying ink to said means for pressing, said writing means being positioned for melting between said means for applying and said means for pressing.

9. A non-impact recording device as claimed in claim 1, said ink is a super cooling ink.

10. A non-impact recording device for recording with ink on a recording medium, comprising:
a recording member having at least one heating member on the surface thereof;
means for applying ink to said at least one heating member on said recording member to form an ink coating on said at least one heating member;
writing means for heating said at least one heating member, said writing means acting directly on said ink coating to melt said coating, intermediate elements being absent, said heated heating member maintaining said coating in a melted condition;
transfer means for pressing said recording medium against said inked heating member, said melted ink becoming attached to said recording medium where said medium is pressed.

11. A non-impact recording device for recording with ink on a recording medium, comprising:
a recording member having at least one heating member on the surface thereof;
means for applying ink to said at least one heating member on said recording member to form an ink coating on said at least one heating member;
writing means for heating said at least one heating member, said heated heating member maintaining said coating in a melted condition; and
transfer means for pressing said recording medium against said inked heating member, said melted ink becoming attached to said recording medium where said medium is pressed,
said recording member surface moving from said means for applying ink to said transfer means for pressing, said means for applying ink being positioned between said writing means and said transfer means.

12. A non-impact recording device as claimed in claim 11, wherein said means for applying ink supplies ink in a non-liquid state, said at least one heating member melting ink from said supply for application to said heating member.

13. A non-impact recording device as claimed in claim 12, wherein said at least one heating member has thermal mass, said thermal mass being adapted to maintain the melted condition of said ink on said at least one heating member until said pressing means presses said recording medium.

14. A non-impact recording device as claimed in claim 10 or 13, and further comprising means for transporting said recording medium with said transferred melted ink thereon away from said means for pressing, said ink cooling and solidifying on said recording medium.

15. A non-impact recording device as claimed in claim 14, and further comprising control means for signal generating, said writing means being adapted to selectively operate in response to an external signal from said control means, said at least one heating element being selectively heated.

16. A non-impact recording device as claimed in claim 10 or 13, wherein said at least one heated member is shaped as a print pattern, ink being transferred to said recording medium in said pattern.

17. A non-impact recording device for recording with ink on a recording medium, comprising:
a recording member having a coating of ink on the surface thereof, said ink coating being subject to melting;
means for applying ink to said surface of said recording member to form said coating;
writing means for melting said ink coating on said recording member surface;
transfer means for pressing said recording medium against said coated surface, said melted ink becoming attached to said recording medium where said medium is pressed,
said recording member surface moving from said means for applying ink to said transfer means, said means for applying ink being positioned between said writing means and said transfer means.

18. A non-impact recording device as claimed in claim 1, 10 or 17 wherein said writing means melts said ink by induction heating said recording member.

19. A non-impact recording device as claimed in claim 1, 11 or 17 wherein said writing means melts said ink by application of heat from an infrared lamp.

20. A non-impact recording device as claimed in claim 1, 11 or 17 wherein said writing means melts said ink by application of a high frequency signal across a capacitor circuit including said ink coating, whereby said ink melts by dielectric losses.

21. A non-impact recording device for recording with ink on a recording medium, comprising:
a recording member having a coating of ink on the surface thereof, said ink coating being subject to melting;
means for applying ink to said surface of said recording member to form said coating;
writing means for melting said ink coating on said recording member surface, said writing means acting directly on said ink coating to melt said coating, intermediate elements being absent;
first transfer means for pressing a first recording medium against said coated surface, a first portion of said melted ink becoming attached to said first recording medium where said first recording medium is pressed,
second transfer means for pressing a second recording medium against said coated surface, a second portion of said melted ink transferred by said first transfer means becoming attached to said second recording medium where said second recording medium is pressed.

* * * * *